No. 680,536. Patented Aug. 13, 1901.
T. T. MILBURN.
COTTON CHOPPER.
(Application filed June 12, 1901.)
(No Model.)
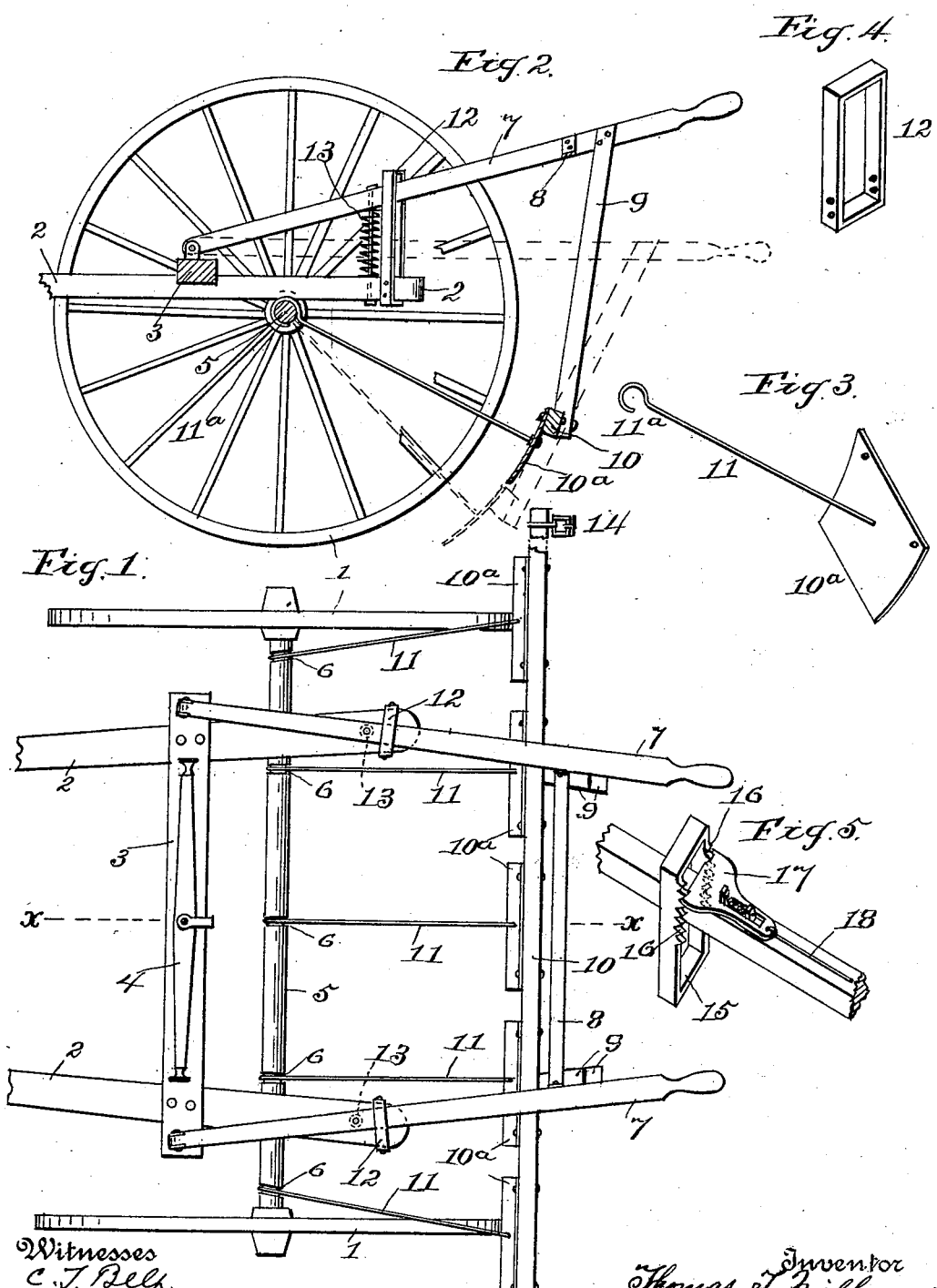

UNITED STATES PATENT OFFICE.

THOMAS T. MILBURN, OF COLUMBIA, SOUTH CAROLINA.

COTTON-CHOPPER.

SPECIFICATION forming part of Letters Patent No. 680,536, dated August 13, 1901.

Application filed June 12, 1901. Serial No. 64,260. (No model.)

*To all whom it may concern:*

Be it known that I, THOMAS T. MILBURN, a citizen of the United States, residing at Columbia, in the county of Richland and State of South Carolina, have invented certain new and useful Improvements in Cotton-Choppers; and I do hereby declare the following to be a full, clear, and exact description of the invention, such as will enable others skilled in the art to which it appertains to make and use the same.

This invention relates to cultivators, and particularly to the class of wheel or sulky cotton-choppers.

One object of the invention is to provide a sulky or wheel cotton-chopper having a series of cutters pivotally connected to the sulky-axle at various points along the length of the axle, said cutters being spaced apart yet connected together and to spring-controlled hand-levers, so as to be given vertical movement.

A further object of the invention is to provide a cotton-chopper of simplified peculiar construction and arrangement of parts, so that two plows may be attached for laying off corn, or a scraper may be attached for leveling the ground, or, if desired, a marker may be applied without altering or reconstructing the machine or any parts thereof.

A still further object of the invention is to provide a series of cutters so arranged that the end cutters will cut out the cotton damaged by the sulky-wheels traveling in front of the cutters and so that the central cutter will operate upon the cotton damaged by the trampling of the horse and leave a clear walkway for the operator.

In the accompanying drawings, forming a part of this application, Figure 1 is a top plan view. Fig. 2 is a sectional view on the plane indicated by the dotted line $x$ $x$, Fig. 1, with the whiffletree removed. Fig. 3 is a perspective view of one of the cutters and its connecting-rod. Fig. 4 is a perspective view of one of the straps. Fig. 5 is a detail view of a modification.

The same numeral references denote the same parts throughout the several views of the drawings.

The sulky comprises the usual wheels 1, shafts 2, shaft-bar 3, whiffletree 4, and an axle 5, having a series of circular grooves 6. Hand-levers 7 are pivoted at one end to the bar 3, and near the other or free end of said levers they are connected by a brace 8. Secured to and depending from the hand end of the levers are hangers 9, to which is attached a cutter-bar 10, having a series a cutters $10^a$, rigidly secured thereto and extending across the entire width of the sulky and reaching beyond the sulky-wheels, for purposes hereinafter described. Each cutter is connected to the axle 5 by a rod 11, having a hook end $11^a$, loosely hung in the grooves 6, so as to be free to move with every movement of the cutters. The hand-levers 7 work through guide-straps 12, secured to the inner ends of the shafts, and said levers are controlled by spiral springs 13, interposed between said shaft ends and the levers forward of the straps 12. The straps 12 not only act as guides for the levers, but they limit the upward movement of the levers. The cutter-bar 10 is extended beyond the wheels for the purpose of attaching a device 14, which may be employed to mark off or indicate the next cut, or a plow or other cultivator may be attached to the axle, as desired.

In operation it will be seen that the springs hold the cutters clear of the ground until the hand-levers are pressed downwardly to give the cutters the desired depth of cut, and such pressure is removed when it is desired to return the cutters or lift them upwardly.

Referring to the modification shown in Fig. 6, the rear edge of the strap 15 is provided with notches or teeth 16, and a spring-controlled dog 17 is slidably secured to the hand-levers, and the dog has a pull wire or cord 18 in convenient reach of the operator, the strap and dog being the same on each side of the machine. This device may be used when it is desired to keep the cutters at a certain depth for any length of time and obviates the necessity of the operator holding the cutters down.

It is obvious that the cutters will accommodate themselves to the variations in the ground surface, so as to make a clean even thinning of the cotton, and the spring-controlled arms will permit the operator giving any desired depth of cut, and one lever may be operated independent of the other. The cutters being specially arranged relative to each other and to the wheels and draft of the sulky adds further value to the machine as a thinner and is vastly essential on account of certain of the cutters following in the path of the wheels and horse, so that these paths are cleaned and left in clear condition.

Having thus described my invention, what I claim as new, and desire to secure by Letters Patent, is—

1. In a sulky cotton-chopper, the combination with the pivoted hand-levers, the hangers secured to and depending from the levers, the straps through which the levers work, and the spiral springs interposed between the levers and the sulky-shafts, of the cutter-bar secured to the hangers, a series of cutters attached to the bar, and a rod fixed to each cutter and pivoted to the sulky-axle.

2. In a sulky cotton-chopper, the combination with the sulky-axle having a series of circular grooves, the hand-levers pivoted to the sulky-shafts, the guide-straps secured to the shafts and through which the levers work and are thereby limited in movement, and the spiral springs interposed between the shafts and the levers and in front of the straps, of the cutter-bar hung from the free end of the levers, a series of cutters secured at intervals to the cutter-bar, and rods having one end attached to the cutters and the other end working in the said axle-grooves.

3. The combination, with a cotton-chopper having pivoted hand-levers, and the cutters hung from the levers, of means to control the movement of said levers and cutters, comprising the spiral springs, the strap or guide having a notched or toothed edge, and a spring-controlled dog to engage said edge.

In testimony whereof I affix my signature in presence of two witnesses.

THOS. T. MILBURN.

Witnesses:
A. C. DE PASS,
W. R. BROOKS, Jr.